US012812034B2

(12) United States Patent
Thomasian et al.

(10) Patent No.: US 12,812,034 B2
(45) Date of Patent: Nov. 24, 2026

(54) MANAGING COMMUNICATION DISRUPTIONS IN NETWORK-BASED COMMUNICATION SESSIONS

(71) Applicant: Microsoft Technology Licensing, LLC, Redmond, WA (US)

(72) Inventors: Eric Edmond Thomasian, Los Angeles, CA (US); Smrati Gupta, Issaquah, WA (US); Amer Aref Hassan, Kirkland, WA (US); Vandana Thomas, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 18/827,097

(22) Filed: Sep. 6, 2024

(65) Prior Publication Data

US 2026/0075137 A1 Mar. 12, 2026

(51) Int. Cl.

| | |
|---|---|
| ***H04M 3/42*** | (2006.01) |
| ***G06F 40/40*** | (2020.01) |
| ***H04W 4/16*** | (2009.01) |

(52) U.S. Cl.

CPC ........ *H04M 3/42221* (2013.01); *G06F 40/40* (2020.01); *H04M 3/42365* (2013.01); *H04W 4/16* (2013.01)

(58) Field of Classification Search

CPC ............... H04M 3/42221; H04M 3/42; H04M 3/42365; G06F 40/40

USPC ...................................... 379/201.01; 370/352

See application file for complete search history.

(56) References Cited

U.S. PATENT DOCUMENTS

| | | | | |
|---|---|---|---|---|
| 7,830,860 | B2 * | 11/2010 | Farris | H04Q 3/0045 370/352 |
| 9,843,672 | B1 | 12/2017 | Agrawal | |
| 10,187,512 | B2 * | 1/2019 | Singh | H04M 3/42391 |
| 2006/0238608 | A1 | 10/2006 | Lee | |

(Continued)

FOREIGN PATENT DOCUMENTS

| | | |
|---|---|---|
| CN | 103297629 B | 8/2015 |
| CN | 104601814 A | 6/2018 |

*Primary Examiner* — Ahmad F. Matar

(74) *Attorney, Agent, or Firm* — Schwegman Lundberg & Woessner, P.A.

(57) ABSTRACT

This disclosure relates to managing communication disruptions during network-based communication sessions, such as VoIP calls and online meetings. The technical problem addressed is the disruption caused by poor network connectivity, leading to unintelligible speech and communication inefficiencies. The technical solution involves a client-side system that detects poor connectivity and initiates a recording or transcription of the speaker's speech. The recorded or transcribed speech is queued for transmission once network conditions improve, ensuring no part of the conversation is lost. The system may also utilize generative AI models to summarize the transcript, reducing data size and enhancing communicative efficiency. Additionally, the system includes components for monitoring communication channel metrics, managing media transmission, and providing user interface feedback. This solution helps maintain the flow of communication, reduces disruptions, and improves meeting productivity by providing a clear and complete record of what was said during periods of poor connectivity.

20 Claims, 4 Drawing Sheets

(56) References Cited

U.S. PATENT DOCUMENTS

| | | | | |
|---|---|---|---|---|
| 2007/0211876 | A1 | 9/2007 | Othmer | |
| 2015/0098693 | A1 | 4/2015 | Shaffer | |
| 2020/0265856 | A1* | 8/2020 | Gummadi | G10L 25/60 |
| 2025/0008015 | A1* | 1/2025 | Amir | H04M 1/72436 |
| 2025/0232496 | A1* | 7/2025 | Ethirajan | G06N 3/045 |

* cited by examiner

MANAGING COMMUNICATION DISRUPTIONS IN NETWORK-BASED COMMUNICATION SESSIONS

TECHNICAL FIELD

Embodiments pertain to network-based communication technologies. Some embodiments relate to managing communication disruptions during network-based communication sessions.

BACKGROUND

Network-based communication sessions such as voice calls, video calls, and network-based meetings have revolutionized the way individuals and organizations communicate. These technologies leverage the power of computer networking to facilitate audio and video communications between remote users to enable a more dynamic interaction model, where participants can connect from virtually anywhere, using a variety of devices such as smartphones, tablets, and computers. The flexibility and cost-effectiveness of VoIP calls and online meetings have led to their widespread adoption in both personal and professional contexts.

Network-based communication systems are now integral to numerous daily activities, ranging from business conferences and remote education to personal chats and family gatherings. These systems support various features that enhance interaction, such as screen sharing, real-time messaging, and file exchange, making them versatile tools for comprehensive digital communication. The continuous evolution of network-based communication technologies is driven by advancements in internet infrastructure, audiovisual technology, and software development, further enriching the user experience and expanding their applicability.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
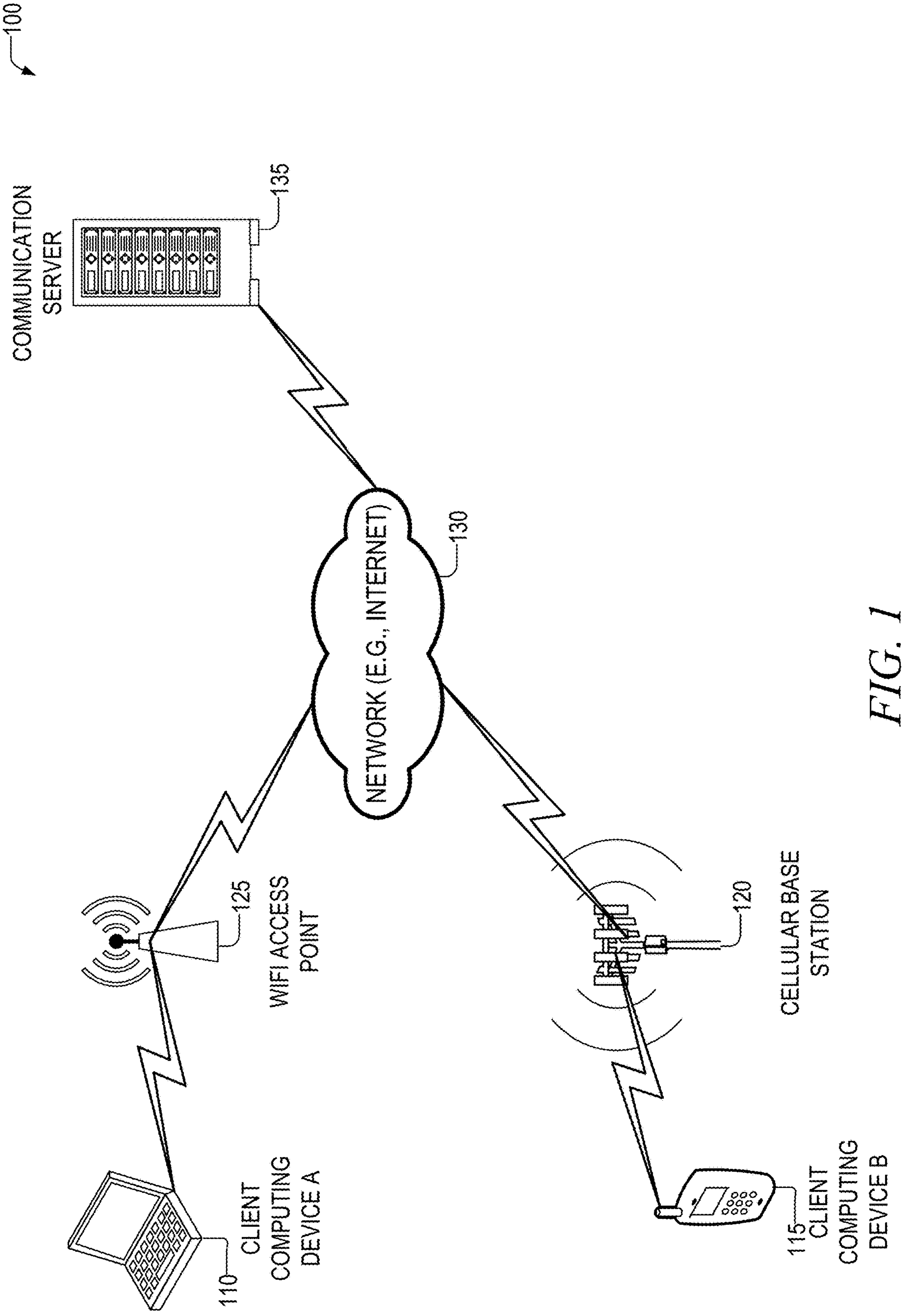
FIG. 1 shows a network-based communication environment including client computing devices, a WiFi access point, a cellular base station, and a communication server, according to some examples of the present disclosure.

During network-based communication sessions, such as VoIP calls and online meetings, participants may encounter issues related to poor network connectivity. These problems may result from weak Wi-Fi or cellular signals and may manifest to the user as audio disruptions that can severely hinder the flow of communication. For instance, when a participant experiences spotty service, it often results in partial or completely unintelligible speech being transmitted. This not only disrupts the immediate exchange of information but also leads to confusion and repeated requests for clarification among participants. Such interruptions are particularly detrimental in professional settings where clear and continuous communication is expected. The participants may not realize immediately that their speech is not being transmitted clearly, leading to significant portions of the conversation being lost. This scenario forces the speaker to repeat themselves once the connectivity issue is recognized, thereby wasting time and reducing the overall efficiency of the communication session.

Disclosed in some examples, are systems, methods, and machine-readable mediums for initiating a recording or transcription of a speaker's speech during a network-based communication session when poor connectivity is detected and providing that speech, transcript, or a summary of the transcript, to other participants when the connectivity of the speaker allows. This process may be managed by the client device of the speaker, ensuring that the speech is captured even if the connection to the server is poor. The recorded or transcribed speech is then queued for transmission which happens once the network conditions support it, ensuring that no part of the conversation is lost. This allows other participants to receive a clear and complete record of what was said during periods of poor connectivity, thereby minimizing disruptions, improving meeting productivity, and enhancing the overall communication experience. In some examples, instead of sending the recorded or transcribed speech, the system may utilize one or more generative AI models to summarize the speech. In some examples, participants are informed of the connectivity issues and are provided with the transcription or recording, reducing the need for repetitions and clarifications.

In some examples, sending transcriptions of speech rather than the speech recordings themselves may be advantageous. Transcriptions, which convert spoken language into written text, inherently require less data bandwidth compared to audio files. This reduction in data size may be beneficial under conditions of poor network connectivity. Text data, due to its smaller size, can be transmitted more reliably and quickly over network connections whose quality might not support the higher data demands of audio transmission. Further enhancing the efficiency of this system, certain examples may utilize artificial intelligence (AI) models, such as generative AI models to summarize the transcribed speech. This summarization process reduces the amount of text data even further, which is particularly advantageous under severe network constraints. By distilling the speech into its essential points, the AI summarization not only decreases the data load but also aids in quicker comprehension of the communication by meeting participants. This dual benefit of reduced data size and enhanced communicative efficiency ensures that the core information is transmitted and understood rapidly to maintain the flow of discussion without undue delays or repetition.

In some examples, a user interface (UI) for the network-based communication system provides feedback to users experiencing connectivity issues during network-based communication sessions. When the system detects weak coverage or poor connectivity, the UI notifies the user that the recording has started, indicating that the connection is unstable but allowing the user to continue speaking. In some examples, the UI may first obtain approval from the user before recording. This notification helps maintain the flow of conversation and ensures that the user is aware of the ongoing recording process. This notification may be visual, audible, haptic, or some combination of the aforementioned.

Once the connection improves, the UI informs the user that the recorded or transcribed message is being sent to the other participants. In some examples, users may opt-out or cancel the transmission. Additionally, the UI may provide feedback when the transmission is complete, allowing the user to resume normal conversation. The system may also use AI to summarize the speaker's words further and deliver the summary via a side channel, ensuring that essential information is communicated efficiently. Overall, the UI elements are designed to minimize disruptions, provide clear communication cues, and support the user experience during periods of poor connectivity.

In some examples, the network-based communication server, which manages the network-based communication session may also record, transcribe, and/or summarize the conversations held by other participants that the user experiencing spotty service has missed. Once the connection is strong enough, the network-based communication service, in addition to receiving the recording, transcript, or summary of the speech of the user that experienced spotty service, may send the summary, recording, or transcript of the conversations held by other participants. This ensures that all parties are brought up to speed on what they missed.

In some examples, when a transcription is provided instead of an audio recording, the system may detect emotional tone. In some examples, the emotional tone may be provided along with, or as part of, the transcript. For example, if the speaker is happy, the transcript may indicate that the user is happy. This may allow the transcript to retain the impact and meaning of the original speech which may be otherwise lost when converted to text. Example algorithms for detecting emotional tone may include random forest, support vector machines, convolutional neural networks (CNN), long short-term memory networks, hidden Markov models, and the like.

The system may utilize one or more metrics to determine whether or not a communication channel that the voice packets are transmitted upon is degraded such that the voice of the user is lost or the quality is degraded. Example metrics may be packet loss rate, latency, jitter, bitt error rate, signal to noise ratio, round-trip time, received signal strength (RSSI), or the like. In some examples, the metric used may vary based upon how the client device is connected to the network. For example, metrics for cellular networks might be different than metrics for Wi-Fi or wired networks. In some examples, one or more metrics may be calculated solely on the client, but in other examples, a server might report one or more of these metrics back to the client. In some examples, loss of metric reports back to the client may be cause for determining that the voice packets sent by the client are not being received by the server. In some examples, the metrics may be compared to a specified threshold. The specified threshold may indicate a probability that the voice packets are not reaching the server or are degraded.

In some examples, multiple metrics may be used and the system may employ various methods to combine multiple metrics for determining communication channel degradation. One approach is to use a weighted scoring system, where each metric is assigned a weight based on its importance in assessing channel quality. For example, packet loss rate might be given a higher weight than jitter. The system calculates a composite score by summing the weighted values of all metrics, and this score is then compared to a predefined threshold to determine if the channel is degraded.

Another method involves the use of logical rules or decision trees. For instance, the system may define a set of if-then-else rules that combine multiple metrics. An example rule could be: "If packet loss rate exceeds 5% and latency is greater than 200 ms, then the channel is considered degraded." This approach allows for more nuanced decision-making by considering the interplay between different metrics.

Machine learning models, such as random forests or neural networks, can also be employed to analyze multiple metrics simultaneously. These models are trained on historical data to recognize patterns indicative of channel degradation. Once trained, the model can predict the likelihood of degradation based on real-time metrics, providing a probabilistic assessment rather than a binary decision.

In some cases, the system may use a combination of these methods. For example, a weighted scoring system could be used in conjunction with logical rules to provide a more robust assessment. Additionally, the system might employ adaptive algorithms that adjust the weights or rules based on real-time feedback, ensuring that the degradation detection mechanism remains accurate under varying network conditions.

By leveraging multiple metrics and combining them through various techniques, the system can achieve a more comprehensive and reliable assessment of communication channel quality, thereby ensuring timely and accurate detection of degradation.

In some examples, instead of, or in addition to channel metrics, the system may use a transcript of the communication session to identify when a user's speech is lost or degraded. This can be achieved by detecting phrases that indicate user frustration, such as "I can't hear you," "are you on mute?" or "still there?" Either the client and/or the network-based communication server can detect these phrases. The network-based communication server may then instruct the client to start recording or transcribing. This instruction can be sent even if the communication channel is poor, because the channel may not support voice but can handle smaller instruction packets as the downlink channel, which is powered by a large base station, may be better than the uplink channel, which relies on lower-power transmitters like those in cell phones.

In still other examples, instead of waiting for the channel quality to improve to send the transcript, voice packets, or recording, a client device may have the ability to send the voice recording, a transcript, a summary, or the like through a side-channel. For example, if the voice packets are transmitted on a first channel (e.g., a cellular channel) and the client device then connects to a WiFi channel, the voice recording or transcription may be sent via the side-channel. The data may be sent to the communication server with a key or other value that associates the packets with the particular communication session so that the communication server can provide them in the correct session.

The technical problem addressed by the invention is the disruption of communication during network-based sessions, such as VoIP calls and online meetings, due to poor network connectivity. This issue may be caused by weak or low-quality Wi-Fi, cellular, or other network signals and may manifest as audio disruptions, leading to partial or completely unintelligible speech being transmitted. Such interruptions not only disrupt the immediate exchange of information but also cause confusion and repeated requests for clarification among participants, thereby wasting time and reducing the overall efficiency of the communication session. The technical solution provided by the invention involves a system and method for initiating a recording or transcription of the speaker's speech when poor connectivity is detected. This process is managed by the client device of the speaker, ensuring that the speech is captured even if the connection to the server is poor. The recorded or transcribed speech is then queued for transmission once the network condition improves, ensuring that no part of the conversation is lost. Additionally, the system may utilize generative AI models to summarize the transcript, further reducing data size and enhancing communicative efficiency. This solution helps maintain the flow of communication, reduces disruptions, and improves meeting productivity by providing a clear and complete record of what was said during periods of poor connectivity.

As used herein, a communication channel is a portion of a communication medium (e.g., such as radio frequency spectrum) used to transmit information from one point to another. The portion may be a frequency-portion, a time-based portion, a code-allocation, or the like. In the context of network-based communication sessions, it refers to the pathway through which voice, video, or data packets are sent between devices, such as through Wi-Fi, cellular networks, or wired connections. The quality and reliability of a communication channel can significantly impact the clarity and continuity of the transmitted information.

FIG. 1 shows a network-based communication environment 100 according to some examples of the present disclosure. The network-based communication environment 100 includes a client computing device A 110 and a client computing device B 115. Client computing device A 110 connects to a WiFi access point 125, which in turn connects to a network 130, such as the Internet. Client computing device B 115 connects to a cellular base station 120, which also connects to the network 130. The network 130 facilitates communication between the client computing devices and a communication server 135 and between the client computing devices.

Client computing device A 110 and client computing device B 115 represent user devices that participate in network-based communication sessions. The network-based communication session may be a voice call, video call, network-based meeting, or the like. These devices can be any computing devices capable of handling voice, video, or data communication, such as laptops, smartphones, or tablets. The WiFi access point 125 provides wireless connectivity to client computing device A 110, enabling client computing device A 110 to access the network 130. The cellular base station 120 provides cellular connectivity to client computing device B 115, allowing client computing device B 115 to connect to the network 130.

The network 130 serves as the backbone for data transmission between the client computing devices and the communication server 135. The communication server 135 manages the communication sessions, ensuring that data packets are correctly routed between the devices. The server may also handle tasks such as recording, transcribing, and summarizing speech during periods of poor connectivity, as described in the present disclosure.

In this environment, the system can detect weak connectivity or poor network conditions affecting either client computing device A 110 or client computing device B 115. Upon detecting such conditions, the system initiates a recording or transcription of the speaker's speech at the client side. The recorded or transcribed speech is then queued for transmission once the network condition improves, ensuring that no part of the conversation is lost. This process helps maintain the flow of communication and reduces disruptions during network-based communication sessions.

Figure 2:
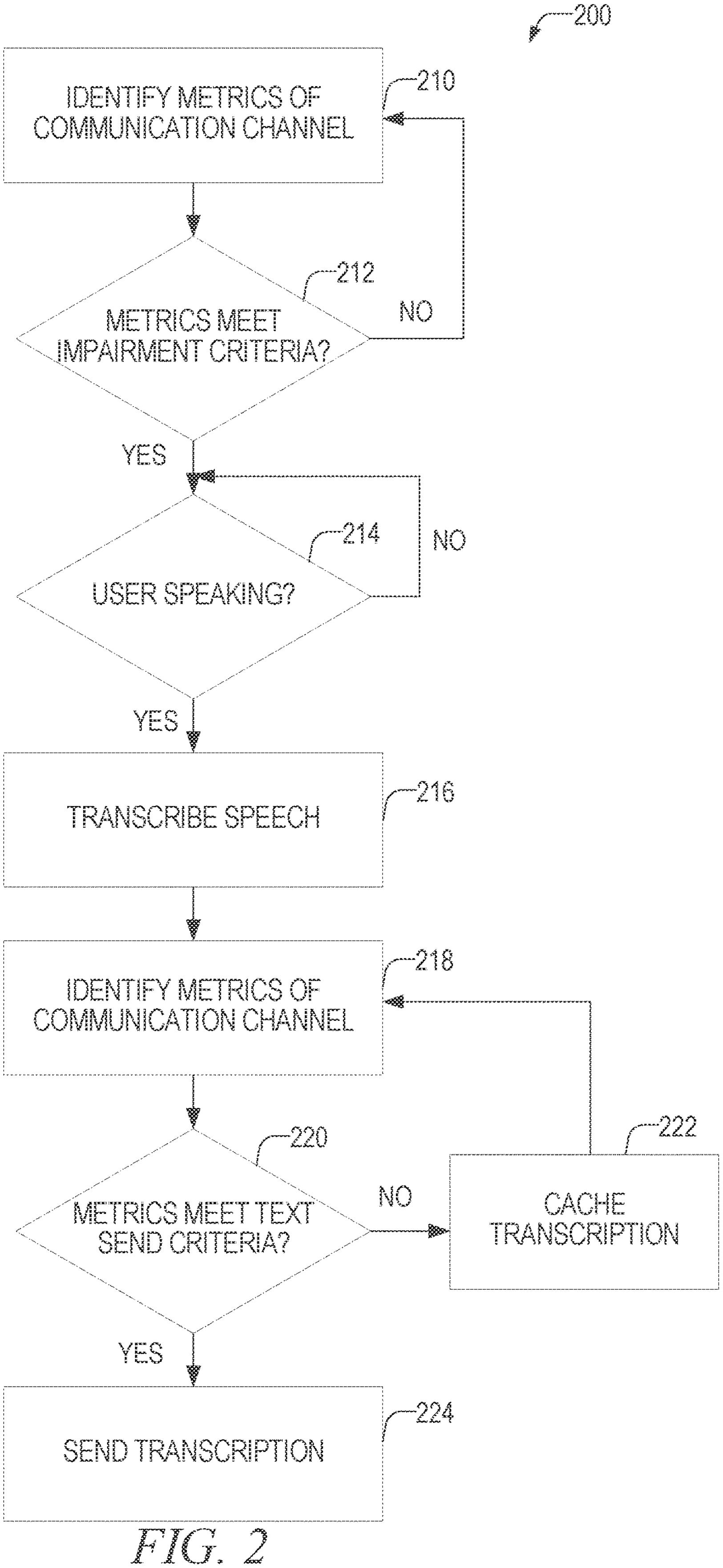
FIG. 2 shows a flow chart diagram illustrating a method for providing a transcript of words spoken when a communication channel is degraded or unavailable, according to some examples of the present disclosure.

FIG. 2 shows a method 200 of providing a transcript of words spoken when a communication channel used to transmit voice packets during a communication session is degraded or unavailable according to some examples of the present disclosure. The method 200 begins with operation 210, identifying metrics of the communication channel. This step involves assessing one or more parameters of the communication channel to determine the current state. Metrics may include one or more of: packet loss rate, latency, jitter, bit error rate, signal-to-noise ratio, round-trip time, or received signal strength (RSSI), among others. These metrics measure one or more properties of the communication channel's performance and help in identifying any potential issues that could affect the quality of the voice transmission. The system may continuously monitor these metrics in real-time to ensure timely detection of any degradation.

Next, operation 212 involves determining whether the identified metrics meet impairment criteria. This decision point evaluates if the communication channel's metrics indicate a potential degradation or loss of voice communications at the server or one or more other devices. The impairment criteria may be predefined thresholds for each metric, such as a specific packet loss rate or latency value. If the metrics do not meet the impairment criteria, the method may loop back to continue monitoring the communication channel. In some examples, the system only takes action when there is a degradation in the communication channel's performance that indicates that the channel is likely unable to support voice packets, or that a quality of the voice received drops below a threshold (e.g., as a result of jitter, or the like). As used herein, impairment criteria refer to predefined thresholds or conditions used to evaluate the quality and performance metrics of a communication channel. These criteria determine whether the channel is experiencing degradation or loss that could impair the transmission of voice, video, or data packets or that indicate that the quality of speech received at the server or other participants is such that the speech is below a threshold quality level. Metrics used when assessing impairment may include packet loss rate, latency, jitter, bit error rate, signal-to-noise ratio, round-trip time, and received signal strength (RSSI). When the metrics meet or exceed these thresholds, the communication channel is considered impaired, triggering actions such as initiating a recording or transcription of the communication to ensure that no part of the conversation is lost. The impairment criteria may be thresholds or may be rules that may combine multiple metrics (e.g., if-then-else rules utilizing multiple channel quality or reliability metrics).

If the metrics meet the impairment criteria, the method proceeds to operation 214, checking if the user is speaking. In some examples, the system only records and/or transcribes speech when the user is actively communicating. In other examples, this step is not done and the system records and/or transcribes all speech when the impairment criteria is met. The system may use voice activity detection (VAD) algorithms to determine if the user is speaking. If the user is not speaking, the method may loop back to continue monitoring the communication channel and user activity. This prevents unnecessary transcription and ensures that only relevant speech is captured.

When the user is speaking, the method moves to operation 216, recording and/or transcribing the speech. The transcription process may utilize speech recognition technologies to accurately capture the spoken words. The system may also include features to handle different accents, languages, and speech patterns to ensure accurate transcription. Additionally, the transcription process may include punctuation and formatting to make the text more readable. In some examples, the speech-to-text algorithms may include hidden Markov models, deep neural networks, or the like.

Following the recording and/or transcription, the method proceeds to operation 218, identifying the metrics of the communication channel again. This step reassesses the communication channel to determine if conditions on the channel would permit the transcript to be sent. The system may use the same metrics and impairment criteria as in operation 210 to evaluate the current state of the communication channel or different metrics and criteria. This ensures that the system only attempts to send the transcript when the communication channel is stable enough to handle the transmission. The use of different metrics and/or impairment criteria may be reflective of the fact that a much smaller transcript is being sent rather than voice packets, thus, the channel conditions may not have to be quite as good to send the transcript as the conditions must be to send voice packets.

The next decision point, operation 220, evaluates whether the metrics meet the criteria for sending the text. If the communication channel's metrics indicate that the communication channel is still not suitable for transmitting the transcript, the method moves to operation 222, caching the transcription. This step involves temporarily storing the transcript until the communication channel conditions improve. The system may use a local cache on the client device to store the transcript securely. The cached transcript may be encrypted to protect the user's privacy and ensure data security.

Once the metrics meet the criteria for sending the recording and/or transcript, the method proceeds to operation 224, sending the recording and/or transcription. This step involves transmitting the transcript to the intended recipients, ensuring that the communication is preserved despite the earlier degradation of the communication channel.

Figure 3:
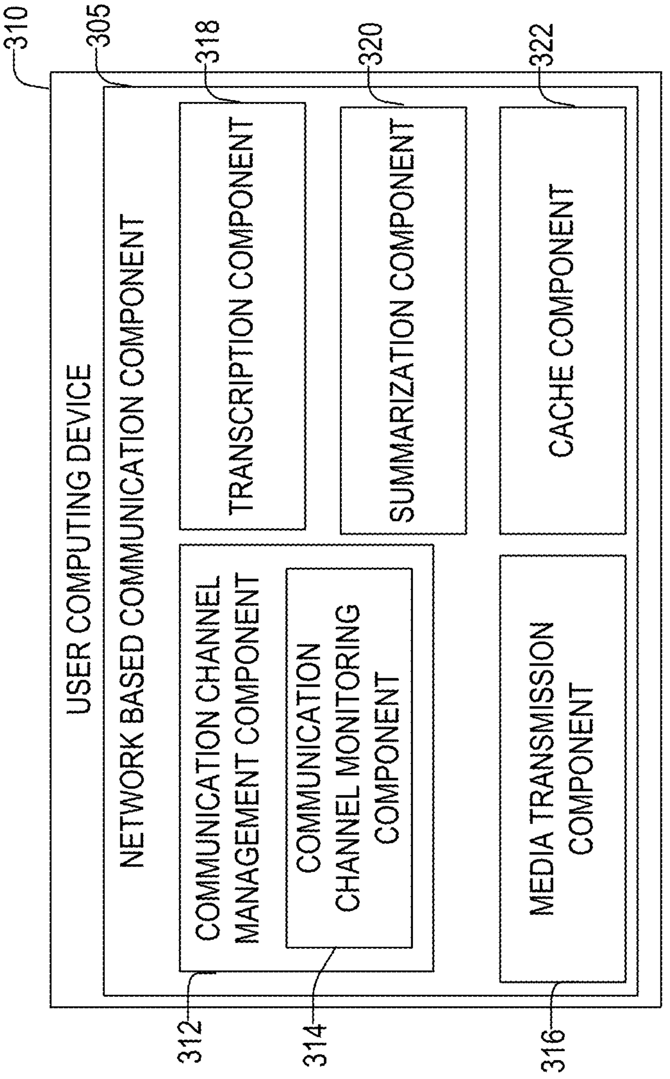
FIG. 3 shows a block diagram of a user computing device with components for managing communication disruptions, according to some examples of the present disclosure.

FIG. 3 shows a logical diagram of a user computing device 310 with a network-based communication component 305 that includes several other components. The user computing device 310 is designed to manage and enhance communication sessions, particularly under conditions of poor network connectivity. The network-based communication component 305 is responsible for managing all aspects of the communication session. This component handles the initiation, maintenance, and termination of communication sessions, coordinating the activities of the other components to provide a robust and reliable communication experience.

The communication channel management component 312 is responsible for overseeing the overall communication channel. This component ensures that the communication session remains stable and manages any necessary adjustments to maintain the quality of the connection. It may include algorithms for setup, teardown, and maintenance of the channel including bandwidth allocation, error correction, and adaptive bitrate streaming to optimize the communication channel's performance.

Within the communication channel management component 312, the communication channel monitoring component 314 determines (e.g., in some examples continuously, semi-continuously, periodically, or on-request) the state of the communication channel. This component measures various metrics such as packet loss rate, latency, jitter, bit error rate, signal-to-noise ratio, round-trip time, and received signal strength (RSSI). These metrics help in identifying any potential issues that could affect the quality of the voice transmission. In some examples, multiple metrics may be utilized with multiple thresholds and criteria. For example, if the RSSI is below a threshold value and if the latency is above a threshold value, the communication channel meets the degradation criteria.

The media transmission component 316 handles the actual transmission of media data, including voice and video packets, during the communication session. This component ensures that the media data is transmitted efficiently and effectively, even under conditions of poor network connectivity. It may employ techniques such as packet prioritization, forward error correction, and jitter buffering to maintain the quality of the media transmission. Additionally, the media transmission component may support multiple transmission protocols to adapt to different network environments.

The transcription component 318 is responsible for converting spoken words into text. When the communication channel monitoring component 314 detects poor connectivity, the transcription component 318 initiates the transcription process, ensuring that the user's speech is captured in text form. This transcription can then be queued for transmission once the network condition improves. The transcription component may utilize advanced speech recognition technologies, including natural language processing (NLP) and machine learning models, to accurately transcribe speech in various languages and dialects.

The summarization component 320 may utilize generative AI models to summarize the transcribed speech. This component reduces the amount of text data, making the transmission over the network easier and faster. The summarization process also aids in quicker comprehension of the communication by meeting participants. The summarization component may employ techniques such as key phrase extraction, topic modeling, and sentiment analysis to generate concise and meaningful summaries of the transcribed speech.

In some examples, the transcription and/or summarization may happen on the network-based communication service. In these examples, the audio recording of the speaker may be sent to the network-based communication service for transcription and/or summarization.

The cache component 322 temporarily may store the transcribed or summarized speech until the network condition improves. This component ensures that no part of the conversation is lost and that the data is securely stored until it can be transmitted to the intended recipients. The cache component may use secure encryption methods to protect the stored data and ensure user privacy. Additionally, it may implement data compression techniques to optimize storage space and facilitate faster transmission once the network conditions improve.

Network-based communication sessions may also include peer-to-peer (P2P) communications, where data is transmitted directly between client devices without the need for an intermediary server. In such instances, the method and systems for managing communication disruptions operate by leveraging the capabilities of the client devices to detect and handle poor connectivity. When a client device participating in a P2P communication session detects that a communication channel's quality has degraded—based on metrics such as packet loss rate, latency, jitter, or received signal strength (RSSI)—it initiates a recording or transcription of the user's speech. This transcription is then queued locally on the client device. Once the communication channel's quality improves, the client device transmits the recording, transcribed text, or a summarized version of it to the peer device. This ensures that no part of the conversation is lost, even in the absence of a central server, thereby maintaining the flow of communication and reducing disruptions during the P2P session. Additionally, the system may utilize side channels, such as WiFi or secondary cellular connections, to transmit the transcription if the primary communication channel remains impaired.

Figure 4:
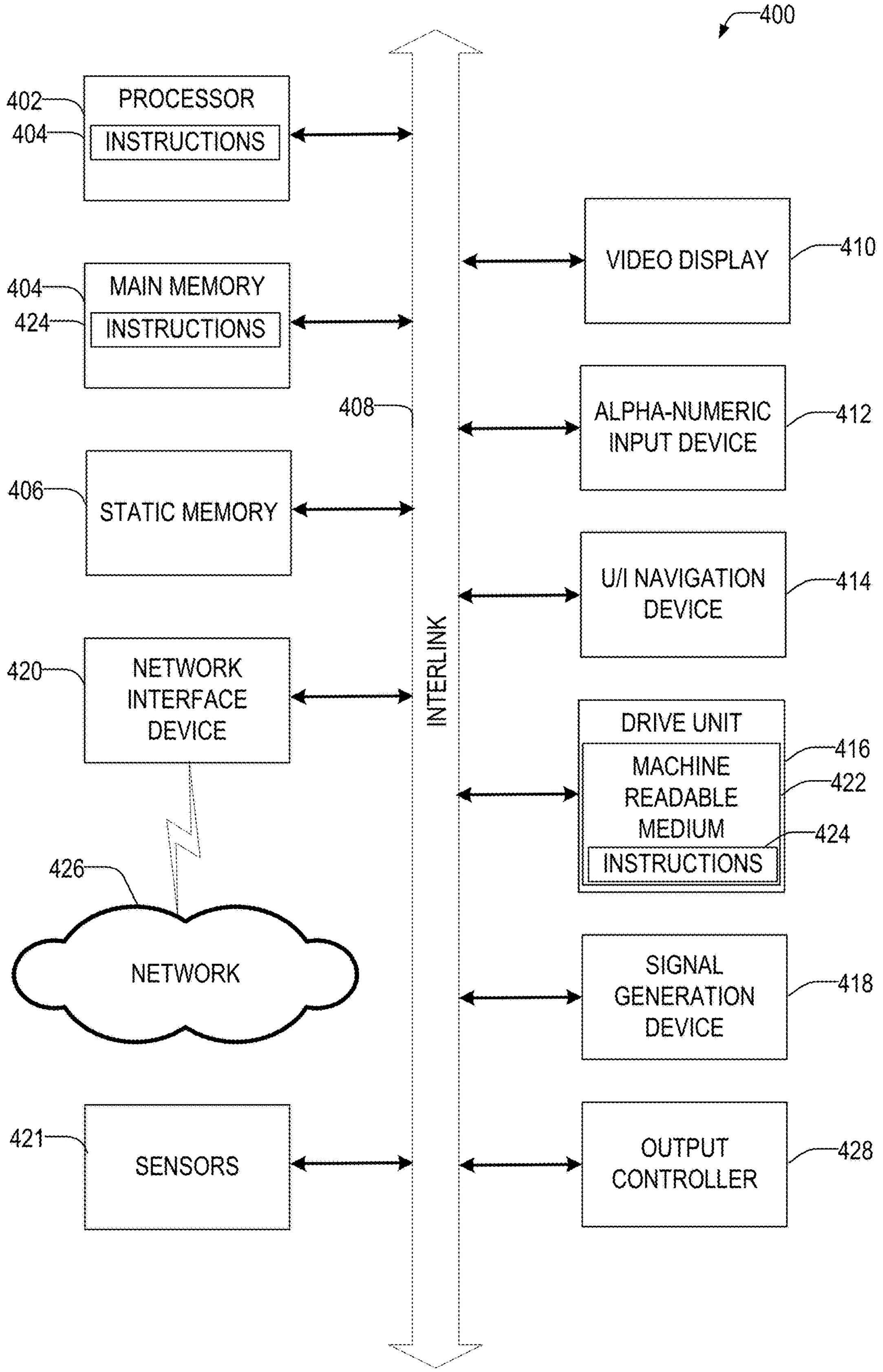
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may be performed. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be in the form of a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 400 may implement or be configured to implement the client computing devices, such as client computing device A 110, client computing device B 115, WiFi access point 125, cellular base station 120, portions of the network 130, and the communication server 135. Machine 400 may perform the method 200, or be configured to include the components shown in FIG. 3.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 400 may include one or more hardware processors, such as processor 402. Processor 402 may be a central processing unit (CPU), a graphics processing unit (GPU), a hardware processor core, or any combination thereof. Machine 400 may include a main memory 404 and a static memory 406, some or all of which may communicate with each other via an interlink (e.g., bus) 408. Examples of main memory 404 may include Synchronous Dynamic Random-Access Memory (SDRAM), such as Double Data Rate memory, such as DDR4 or DDR5. Interlink 408 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or received over a communications network 426 using a transmission medium via the network interface device 420. The Machine 400 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

OTHER NOTES AND EXAMPLES

Example 1 is a method for handling communication channel impairment during a network-based communication session, the method comprising: at a client computing device participating in the network-based communication session: detecting that a first metric of a communication channel used to send voice packets as part of the network-based communication session meets a first criterion indicating a degradation or loss of voice communications; detecting that a user of the client computing device is speaking; in response to detecting that the user of the client computing device is speaking and that the first metric of the communication channel meets the first criterion indicating the degradation or loss of voice communications: starting a function of transcribing speech of the user into transcribed text to create a transcript; determining that a second metric of the communication channel meets a second criterion, the second criterion indicating that the communication channel is capable of supporting transmission of the transcript; and responsive to the communication channel meeting the second criterion, transmitting the transcribed text or a representation of the transcribed text over the communication channel.

In Example 2, the subject matter of Example 1 includes, wherein detecting that the user of the client computing device is speaking comprises analyzing audio signals captured by a microphone of the client computing device to identify speech patterns.

In Example 3, the subject matter of Examples 1-2 includes, responsive to detecting that the user of the client computing device is speaking and that the first metric of the communication channel meets the first criterion indicating the degradation or loss of voice communications, causing the client computing device to start performing the function of transcribing, and causing the client computing device to transmit the transcribed text or a representation of the transcribed text over the communication channel, responsive to the communication channel meeting the second criterion.

In Example 4, the subject matter of Examples 1-3 includes, summarizing, using a generative artificial intelligence model, the transcribed text to create the representation of the transcribed text; and transmitting the representation of the transcribed text.

In Example 5, the subject matter of Examples 1-4 includes, wherein the second criterion indicates a weaker channel than the first criterion.

In Example 6, the subject matter of Examples 1-5 includes, detecting establishment of a second communication channel; and determining that a metric of the second communication channel meets the second criterion, and in response, transmitting the transcribed text or a representation of the transcribed text over the second communication channel.

In Example 7, the subject matter of Examples 1-6 includes, wherein the first metric of the communication channel is or more of a packet loss rate, latency, jitter, bit error rate, signal-to-noise ratio, round-trip time, or received signal strength (RSSI).

In Example 8, the subject matter of Examples 1-7 includes, wherein the method further comprises: responsive to the communication channel meeting the second criterion: presenting a user interface to the user, the user interface providing one or more selectable controls; and receiving a selection of one of the one or more selectable controls indicating that the user wishes to transmit the transcribed text or the representation of the transcribed text, and wherein transmitting the transcribed text or the representation of the transcribed text over the communication channel comprises transmitting the transcribed text or the representation of the transcribed text responsive to receiving the selection of the one of the one or more selectable controls indicating that the user wishes to transmit the transcribed text or the representation of the transcribed text.

In Example 9, the subject matter of Examples 1-8 includes, wherein the method further comprises: responsive to transcribing the speech, providing an indication through a user interface that the speech of the user is being transcribed.

In Example 10, the subject matter of Examples 1-9 includes, providing a user interface on the client computing device; and displaying, via the user interface, an indication that speech of the user is being transcribed in response to detecting that the first metric of the communication channel meets the first criterion and that the user is speaking.

Example 11 is a computing device for handling communication channel impairment during a network-based communication session, the computing device comprising: a hardware processor; a memory device, storing instructions, which when executed by the hardware processor causes the computing device to perform operations comprising: detecting that a first metric of a communication channel used to send voice packets as part of the network-based communication session meets a first criterion indicating a degradation or loss of voice communications; detecting that a user of the computing device is speaking; in response to detecting that the user of the computing device is speaking and that the first metric of the communication channel meets the first criterion indicating the degradation or loss of voice communications: starting a function of transcribing speech of the user into transcribed text to create a transcript; determining that a second metric of the communication channel meets a second criterion, the second criterion indicating that the communication channel is capable of supporting transmission of the transcript; and responsive to the communication channel meeting the second criterion, transmitting the transcribed text or a representation of the transcribed text over the communication channel.

In Example 12, the subject matter of Example 11 includes, wherein the operations of detecting that the user of the client computing device is speaking comprises analyzing audio signals captured by a microphone of the client computing device to identify speech patterns.

In Example 13, the subject matter of Examples 11-12 includes, wherein the operations further comprise: responsive to detecting that the user of the client computing device is speaking and that the first metric of the communication channel meets the first criterion indicating the degradation or loss of voice communications, causing the client computing device to start performing the function of transcribing, and causing the client computing device to transmit the transcribed text or a representation of the transcribed text over the communication channel, responsive to the communication channel meeting the second criterion.

In Example 14, the subject matter of Examples 11-13 includes, wherein the operations further comprise: summarizing, using a generative artificial intelligence model, the transcribed text to create the representation of the transcribed text; and transmitting the representation of the transcribed text.

In Example 15, the subject matter of Examples 11-14 includes, wherein the second criterion indicates a weaker channel than the first criterion.

In Example 16, the subject matter of Examples 11-15 includes, wherein the operations further comprise: detecting establishment of a second communication channel; and determining that a metric of the second communication channel meets the second criterion, and in response, transmitting the transcribed text or a representation of the transcribed text over the second communication channel.

In Example 17, the subject matter of Examples 11-16 includes, wherein the first metric of the communication channel is one or more of a packet loss rate, latency, jitter, bit error rate, signal-to-noise ratio, round-trip time, or received signal strength (RSSI).

In Example 18, the subject matter of Examples 11-17 includes, wherein the operations further comprise: responsive to the communication channel meeting the second criterion: presenting a user interface to the user, the user interface providing one or more selectable controls; and receiving a selection of one of the one or more selectable controls indicating that the user wishes to transmit the transcribed text or the representation of the transcribed text, and wherein transmitting the transcribed text or the representation of the transcribed text over the communication channel comprises transmitting the transcribed text or the representation of the transcribed text responsive to receiving the selection of the one of the one or more selectable controls indicating that the user wishes to transmit the transcribed text or the representation of the transcribed text.

In Example 19, the subject matter of Examples 11-18 includes, wherein the operations further comprise: responsive to transcribing the speech, providing an indication through a user interface that the speech of the user is being transcribed.

In Example 20, the subject matter of Examples 11-19 includes, wherein the operations further comprise: providing a user interface on the computing device; and displaying, via the user interface, an indication that speech of the user is being transcribed in response to detecting that the first metric of the communication channel meets the first criterion and that the user is speaking.

Example 21 is a machine-readable storage medium, storing instructions, which when executed by a machine, cause the machine to perform operations comprising: detecting that a first metric of a communication channel used to send voice packets as part of the network-based communication session meets a first criterion indicating a degradation or loss of voice communications; detecting that a user of the machine is speaking; in response to detecting that the user of the machine is speaking and that the first metric of the communication channel meets the first criterion indicating the degradation or loss of voice communications: starting a function of transcribing speech of the user into transcribed text to create a transcript; determining that a second metric of the communication channel meets a second criterion, the second criterion indicating that the communication channel is capable of supporting transmission of the transcript; and responsive to the communication channel meeting the second criterion, transmitting the transcribed text or a representation of the transcribed text over the communication channel.

In Example 22, the subject matter of Example 21 includes, wherein the operations of detecting that the user of the client computing device is speaking comprises analyzing audio signals captured by a microphone of the client computing device to identify speech patterns [US]21.2 The machine-readable storage medium of Example 21, wherein the operations further comprise: responsive to detecting that the user of the client computing device is speaking and that the first metric of the communication channel meets the first criterion indicating the degradation or loss of voice communications, causing the client computing device to start performing the function of transcribing, and causing the client computing device to transmit the transcribed text or a representation of the transcribed text over the communication channel, responsive to the communication channel meeting the second criterion.

In Example 23, the subject matter of Examples 21-22 includes, wherein the operations further comprise: summarizing, using a generative artificial intelligence model, the transcribed text to create the representation of the transcribed text; and transmitting the representation of the transcribed text.

In Example 24, the subject matter of Examples 21-23 includes, wherein the second criterion indicates a weaker channel than the first criterion.

In Example 25, the subject matter of Examples 21-24 includes, wherein the operations further comprise: detecting establishment of a second communication channel; and determining that a metric of the second communication channel meets the second criterion, and in response, transmitting the transcribed text or a representation of the transcribed text over the second communication channel.

In Example 26, the subject matter of Examples 21-25 includes, wherein the first metric of the communication channel is one or more of a packet loss rate, latency, jitter, bit error rate, signal-to-noise ratio, round-trip time, or received signal strength (RSSI).

In Example 27, the subject matter of Examples 21-26 includes, wherein the operations further comprise responsive to the communication channel meeting the second criterion: presenting a user interface to the user, the user interface providing one or more selectable controls; and receiving a selection of one of the one or more selectable controls indicating that the user wishes to transmit the transcribed text or the representation of the transcribed text, and wherein transmitting the transcribed text or the representation of the transcribed text over the communication channel comprises transmitting the transcribed text or the representation of the transcribed text responsive to receiving the selection of the one of the one or more selectable controls indicating that the user wishes to transmit the transcribed text or the representation of the transcribed text.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

What is claimed is:

1. A method for handling communication channel impairment during a network-based communication session, the method comprising:

at a client computing device participating in the network-based communication session:

detecting that a first metric of a communication channel used to send voice packets as part of the network-based communication session meets a first criterion indicating a degradation or loss of voice communications;

detecting that a user of the client computing device is speaking, wherein detecting that the user of the client computing device is speaking comprises performing voice activity detection at the client computing device on audio captured by a microphone of the client computing device;

in response to detecting that the user of the client computing device is speaking and that the first metric of the communication channel meets the first criterion indicating the degradation or loss of voice communications:

starting a function of transcribing speech of the user into transcribed text to create a transcript;

determining that a second metric of the communication channel meets a second criterion, the second criterion indicating that the communication channel is capable of supporting transmission of the transcript, wherein the second metric is a measured property of the same communication channel used to send the voice packets, and the second criterion comprises a threshold for the measured property; and responsive to the communication channel meeting the second criterion, transmitting the transcribed text or a representation of the transcribed text over the communication channel.

2. The method of claim 1, wherein detecting that the user of the client computing device is speaking comprises analyzing audio signals captured by a microphone of the client computing device to identify speech patterns.

3. The method of claim 1, responsive to detecting that the user of the client computing device is speaking and that the first metric of the communication channel meets the first criterion indicating the degradation or loss of voice communications, causing the client computing device to start performing the function of transcribing, and causing the client computing device to transmit the transcribed text or a representation of the transcribed text over the communication channel, responsive to the communication channel meeting the second criterion.

4. The method of claim 1, further comprising:

summarizing, using a generative artificial intelligence model, the transcribed text to create the representation of the transcribed text; and transmitting the representation of the transcribed text.

5. The method of claim 1, wherein the second criterion indicates a weaker channel than the first criterion.

6. The method of claim 1, further comprising:

detecting establishment of a second communication channel; and determining that a metric of the second communication channel meets the second criterion, and in response, transmitting the transcribed text or a representation of the transcribed text over the second communication channel.

7. The method of claim 1, wherein the first metric of the communication channel is one or more of a packet loss rate, latency, jitter, bit error rate, signal-to-noise ratio, round-trip time, or received signal strength (RSSI).

8. The method of claim 1, wherein the method further comprises:

responsive to the communication channel meeting the second criterion:

presenting a user interface to the user, the user interface providing one or more selectable controls; and receiving a selection of one of the one or more selectable controls indicating that the user wishes to transmit the transcribed text or the representation of the transcribed text, and wherein transmitting the transcribed text or the representation of the transcribed text over the communication channel comprises transmitting the transcribed text or the representation of the transcribed text responsive to receiving the selection of the one of the one or more selectable controls indicating that the user wishes to transmit the transcribed text or the representation of the transcribed text.

9. The method of claim 1, wherein the method further comprises:

responsive to transcribing the speech, providing an indication through a user interface that the speech of the user is being transcribed.

10. The method of claim 1, further comprising:

providing a user interface on the client computing device; and displaying, via the user interface, an indication that speech of the user is being transcribed in response to detecting that the first metric of the communication channel meets the first criterion and that the user is speaking.

11. A computing device for handling communication channel impairment during a network-based communication session, the computing device comprising:

a hardware processor;

a memory device, storing instructions, which when executed by the hardware processor causes the computing device to perform operations comprising:

detecting that a first metric of a communication channel used to send voice packets as part of the network-based communication session meets a first criterion indicating a degradation or loss of voice communications;

detecting that a user of the computing device is speaking, wherein detecting that the user of the client computing device is speaking comprises performing voice activity detection at the client computing device on audio captured by a microphone of the client computing device;

in response to detecting that the user of the computing device is speaking and that the first metric of the communication channel meets the first criterion indicating the degradation or loss of voice communications:

starting a function of transcribing speech of the user into transcribed text to create a transcript;

determining that a second metric of the communication channel meets a second criterion, the second criterion indicating that the communication channel is capable of supporting transmission of the transcript, wherein the second metric is a measured property of the same communication channel used to send the voice packets, and the second criterion comprises a threshold for the measured property; and responsive to the communication channel meeting the second criterion, transmitting the transcribed text or a representation of the transcribed text over the communication channel.

12. The computing device of claim 11, wherein the operations further comprise: responsive to detecting that the user of the client computing device is speaking and that the first metric of the communication channel meets the first criterion indicating the degradation or loss of voice communications, causing the client computing device to start performing the function of transcribing, and causing the client computing device to transmit the transcribed text or a representation of the transcribed text over the communication channel, responsive to the communication channel meeting the second criterion.

13. The computing device of claim 11, wherein the operations further comprise:

summarizing, using a generative artificial intelligence model, the transcribed text to create the representation of the transcribed text; and transmitting the representation of the transcribed text.

14. The computing device of claim 11, wherein the second criterion indicates a weaker channel than the first criterion.

15. The computing device of claim 11, wherein the operations further comprise:

detecting establishment of a second communication channel; and determining that a metric of the second communication channel meets the second criterion, and in response, transmitting the transcribed text or a representation of the transcribed text over the second communication channel.

16. A non-transitory machine-readable storage medium, storing instructions, which when executed by a machine, cause the machine to perform operations comprising:

detecting that a first metric of a communication channel used to send voice packets as part of the network-based communication session meets a first criterion indicating a degradation or loss of voice communications;

detecting that a user of the machine is speaking, wherein detecting that the user of the client computing device is speaking comprises performing voice activity detection at the client computing device on audio captured by a microphone of the client computing device;

in response to detecting that the user of the machine is speaking and that the first metric of the communication channel meets the first criterion indicating the degradation or loss of voice communications:

starting a function of transcribing speech of the user into transcribed text to create a transcript;

determining that a second metric of the communication channel meets a second criterion, the second criterion indicating that the communication channel is capable of supporting transmission of the transcript, wherein the second metric is a measured property of the same communication channel used to send the voice packets, and the second criterion comprises a threshold for the measured property; and responsive to the communication channel meeting the second criterion, transmitting the transcribed text or a representation of the transcribed text over the communication channel.

17. The non-transitory machine-readable storage medium of claim 16, wherein the operations further comprise:

summarizing, using a generative artificial intelligence model, the transcribed text to create the representation of the transcribed text; and transmitting the representation of the transcribed text.

18. The non-transitory machine-readable storage medium of claim 16, wherein the second criterion indicates a weaker channel than the first criterion.

19. The non-transitory machine-readable storage medium of claim 16, wherein the operations further comprise:

detecting establishment of a second communication channel; and determining that a metric of the second communication channel meets the second criterion, and in response, transmitting the transcribed text or a representation of the transcribed text over the second communication channel.

20. The non-transitory machine-readable storage medium of claim 16, wherein the operations further comprise responsive to the communication channel meeting the second criterion:

presenting a user interface to the user, the user interface providing one or more selectable controls; and receiving a selection of one of the one or more selectable controls indicating that the user wishes to transmit the transcribed text or the representation of the transcribed text, and wherein transmitting the transcribed text or the representation of the transcribed text over the communication channel comprises transmitting the transcribed text or the representation of the transcribed text responsive to receiving the selection of the one of the one or more selectable controls indicating that the user wishes to transmit the transcribed text or the representation of the transcribed text.

* * * * *